US006211975B1

(12) United States Patent
Bryant

(10) Patent No.: US 6,211,975 B1
(45) Date of Patent: Apr. 3, 2001

(54) METHOD AND APPARATUS FOR CONTROLLING IMAGE DATA TRANSFER IN A PHOTOGRAPHIC FILM SCANNER

(75) Inventor: Steven M. Bryant, Holley, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/134,609

(22) Filed: Aug. 14, 1998

(51) Int. Cl.[7] ............................................. G03F 3/10
(52) U.S. Cl. ................... 358/527; 358/506; 358/505; 358/487
(58) Field of Search ................... 358/505, 506, 358/527, 487

(56) References Cited

U.S. PATENT DOCUMENTS

| 4,270,141 | * | 5/1981 | Sakamoto | 358/78 |
|---|---|---|---|---|
| 4,771,333 | | 9/1988 | Michaels | 358/213.29 |
| 4,878,119 | | 10/1989 | Beikirch et al. | 358/471 |
| 4,922,335 | * | 5/1990 | Outa et al. | 358/80 |
| 4,926,263 | | 5/1990 | Yokota | 358/474 |
| 5,012,333 | * | 4/1991 | Lee et al. | 358/80 |
| 5,043,827 | | 8/1991 | Beikirch | 358/471 |
| 5,121,195 | * | 6/1992 | Seki et al. | 358/75 |
| 5,369,504 | | 11/1994 | Walker | 358/437 |
| 5,477,265 | | 12/1995 | Tani | 348/241 |
| 5,550,653 | | 8/1996 | TeWinkle et al. | 358/514 |
| 5,719,625 | | 2/1998 | Tani | 348/241 |

* cited by examiner

Primary Examiner—Jerome Grant, II
Assistant Examiner—Kevin C Kianni
(74) Attorney, Agent, or Firm—Francis H. Boos, Jr.

(57) ABSTRACT

A photographic film scanner has a line integration light sensor and a programmed controller which employs a plurality of lookup tables (LUT) sequenced by a common timer to control the timing of data collection and transfer to an asynchronously operating host computer. Delays in the transfer of image data to the host computer which exceed the light sensor line integration time can cause the integrated pixel scan information to become corrupted. Data corruption caused by delays in excess of line integration time is avoided by disabling the light sources and the related image scan operations until it is determined that prior line data transfer to the host is completed whereupon the accumulated data is collected and transferred to the host computer and normal scan operations are re-initiated. Even with the LEDs disabled, excessive build-up of dark current in the light sensors can corrupt the accumulated image information in the light sensor. This corruption is prevented by detecting the excessively long delay, flushing the corrupted data out of the light sensor and re-scanning the image line to develop a fresh line of image data for transfer to the host computer.

8 Claims, 13 Drawing Sheets

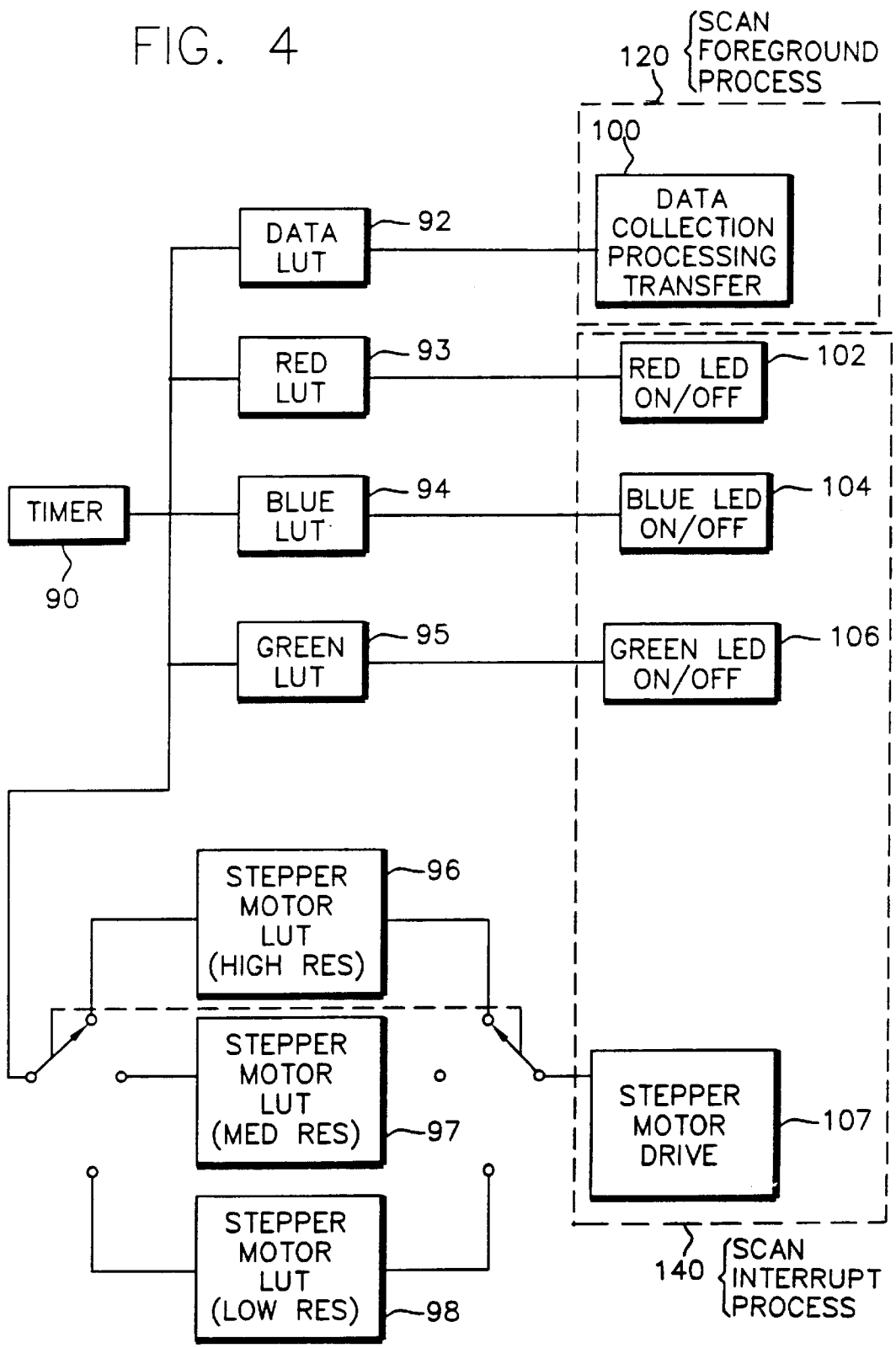

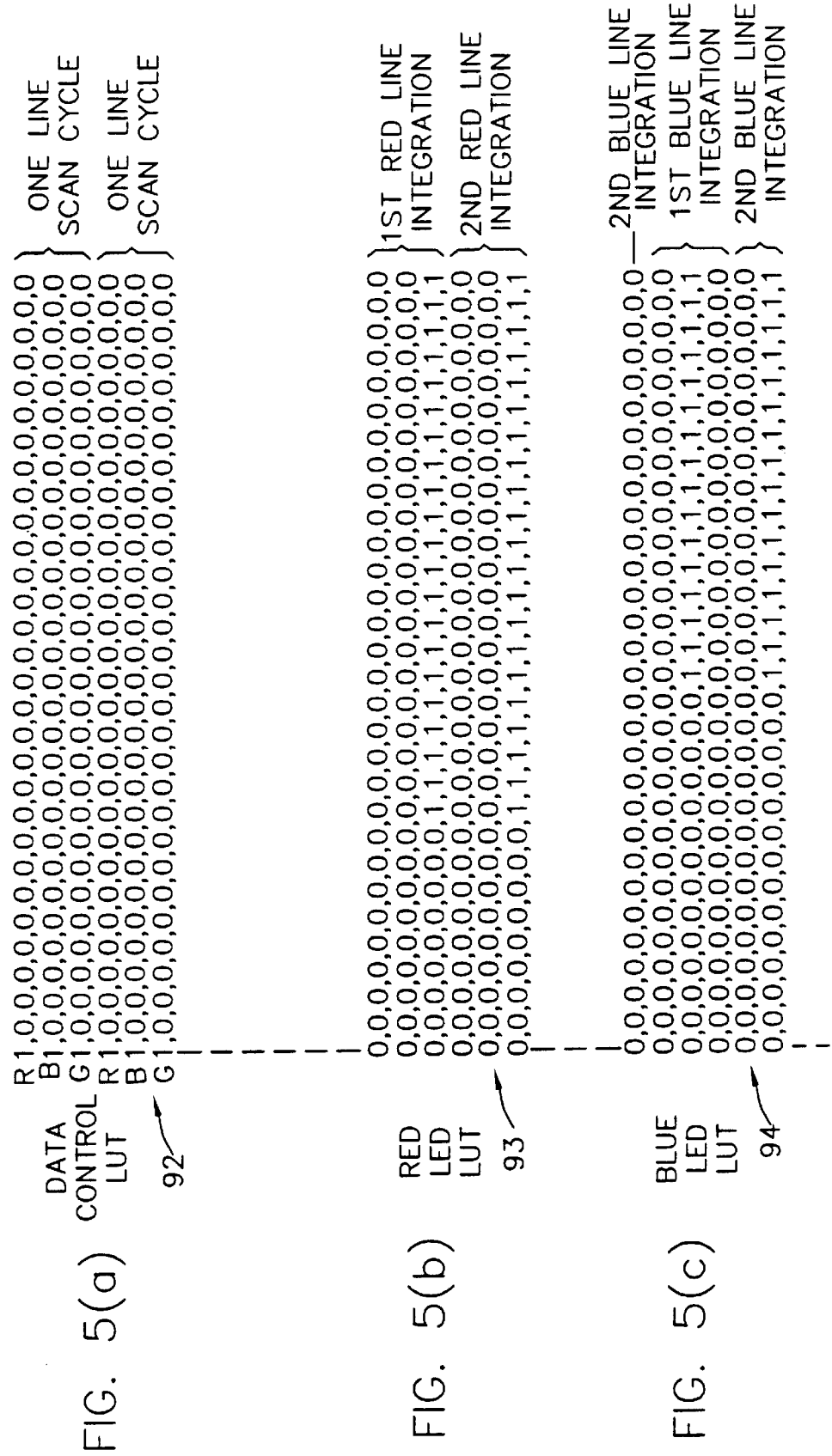

FIG. 5(d) GREEN LED LUT 95

FIG. 5(e) STEPPER MOTOR LUT (HIGH RES) 96

FIG. 5(f) TIMING COUNTER PULSES

| STEPPER MOTOR PULSES PER SCAN LINE | LINES PER FRAME SCAN |
|---|---|
| 3 | 2625 (HIGH RES) |
| (4.5) | 1750 (MEDIUM RES) |
| 9 | 875 (LOW RES) |

FIG. 7

STEPPER MOTOR LUT (HIGH RES)
```
0,0,0,0,0,0,0,0,0,0,1,0,0,0,0,0,0,0,0,0,0,0,0,0,0,0,0,0,0,0
0,0,0,0,0,0,0,0,0,0,1,0,0,0,0,0,0,0,0,0,0,0,0,0,0,0,0,0,0,0
0,0,0,0,0,0,0,0,0,0,1,0,0,0,0,0,0,0,0,0,0,0,0,0,0,0,0,0,0,0
0,0,0,0,0,0,0,0,0,0,1,0,0,0,0,0,0,0,0,0,0,0,0,0,0,0,0,0,0,0
0,0,0,0,0,0,0,0,0,0,1,0,0,0,0,0,0,0,0,0,0,0,0,0,0,0,0,0,0,0
0,0,0,0,0,0,0,0,0,0,1,0,0,0,0,0,0,0,0,0,0,0,0,0,0,0,0,0,0,0
```
─96

FIG. 8(a)

STEPPER MOTOR LUT (MED RES)
```
0,0,0,0,0,0,0,0,0,1,0,0,0,0,0,0,0,1,0,0,0,0,0,0,0,0,0,0,0,0
0,0,0,0,0,0,0,0,0,1,0,0,0,0,0,0,0,1,0,0,0,0,0,0,0,0,0,0,0,0
0,0,0,0,0,0,0,0,0,1,0,0,0,0,0,0,0,1,0,0,0,0,0,0,0,0,0,0,0,0
0,0,0,0,0,0,0,0,0,0,0,0,0,0,0,0,0,1,0,0,0,0,0,0,0,0,0,0,0,0
0,0,0,0,0,0,0,0,0,1,0,0,0,0,0,0,0,1,0,0,0,0,0,0,0,0,0,0,0,0
0,0,0,0,0,0,0,0,0,0,0,0,0,0,0,0,0,1,0,0,0,0,0,0,0,0,0,0,0,0
```
─97

FIG. 8(b)

STEPPER MOTOR LUT (LOW RES)
```
0,0,0,0,0,0,0,1,0,0,0,0,0,1,0,0,0,0,0,1,0,0,0,0,0,0
0,0,0,0,0,0,0,1,0,0,0,0,0,1,0,0,0,0,0,1,0,0,0,0,0,0
0,0,0,0,0,0,0,1,0,0,0,0,0,1,0,0,0,0,0,1,0,0,0,0,0,0
0,0,0,0,0,0,0,1,0,0,0,0,0,1,0,0,0,0,0,1,0,0,0,0,0,0
0,0,0,0,0,0,0,1,0,0,0,0,0,1,0,0,0,0,0,1,0,0,0,0,0,0
0,0,0,0,0,0,0,1,0,0,0,0,0,1,0,0,0,0,0,1,0,0,0,0,0,0
```
─98

FIG. 8(c)

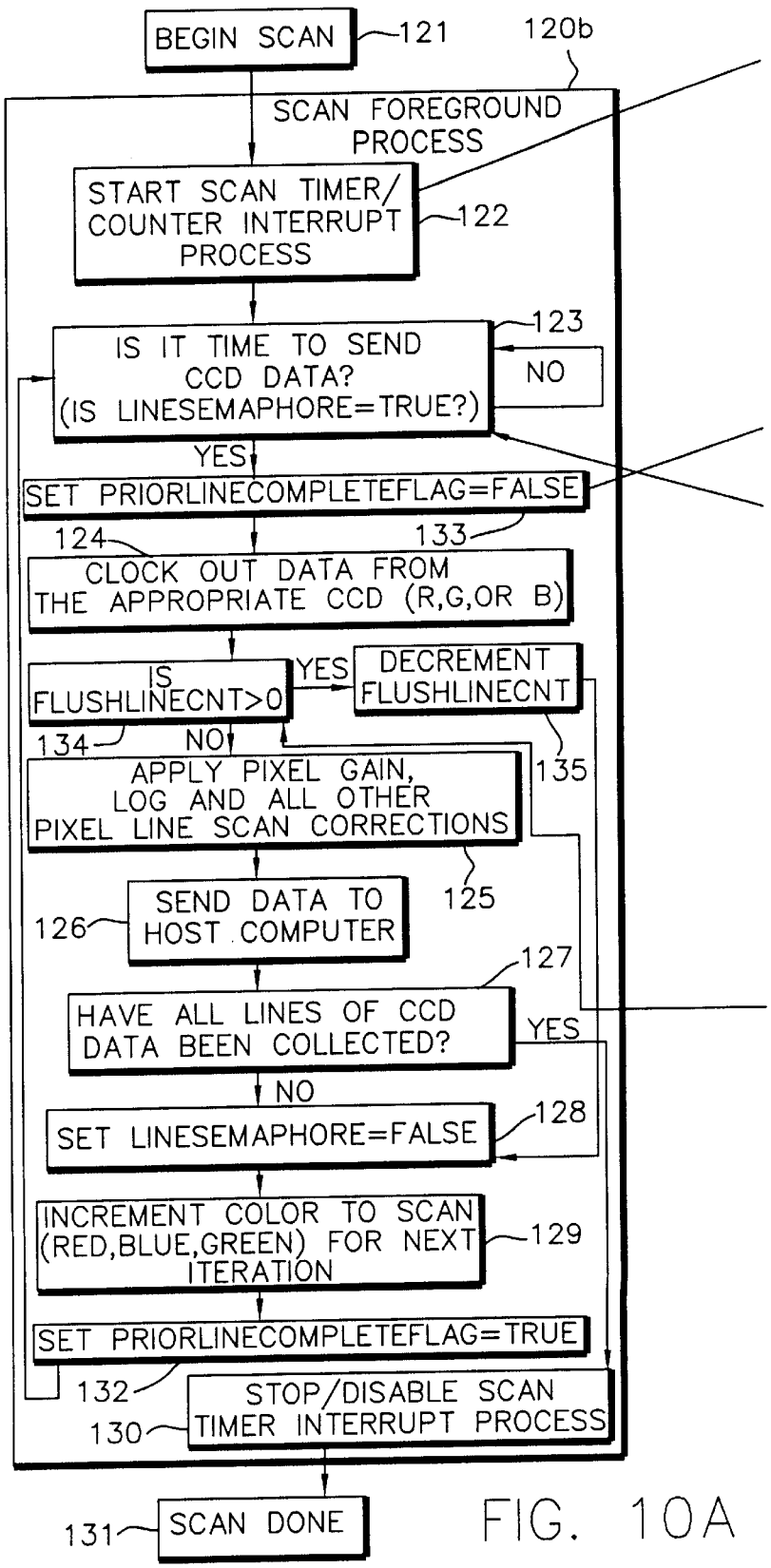

METHOD AND APPARATUS FOR CONTROLLING IMAGE DATA TRANSFER IN A PHOTOGRAPHIC FILM SCANNER

CROSS REFERENCE TO RELATED APPLICATION

Cross reference is made to commonly assigned, copending U.S. applications Ser. No. (Attorney Docket 77989), filed concurrently herewith.

FIELD OF THE INVENTION

The invention relates generally to the field of photographic film scanners and, more particularly, to method and apparatus for controlling image data collection and data transfer to a host computer.

BACKGROUND OF THE INVENTION

Photographic film scanners are known in which image frames on a strip of photographic film are scanned to convert the optical image frames into digital image data which can be stored and manipulated in a computer and, at the user's option, sent to a digital printer for generating hardcopy image prints. It is common in such scanners, to scan the image frame by transporting the film strip through an optical imaging path in which an exposure light source is shone through the image and focussed onto a linear CCD sensor to capture the image information one scan line at a time. The exposure light source may comprise a linear, interleaved array of spectrally distinct light emitting diodes (LED), for example, emitting in the red, blue and green spectra. In order to achieve accurate color rendition in the scanner it is necessary to perform a calibration of the LED exposure lights primarily to equalize the light outputs of the respective red, blue and green LED's. The analog pixel-by-pixel image information captured on the linear CCD light sensor must be clocked out of the CCD, digitized, processed and transferred to a host computer in synchronism with the transport motion of the film in such a manner that the transferred data is accurate and that no data is lost as a result of asynchronous operation between the scanner and the host computer. Internal operations of the scanner typically involve the use of separate timers to control the light source, film transport motor drive and data clocking/transfer functions, which require complex synchronizing provisions for control of the separate timers. Changing the scanning resolution complicates the control procedure as does changing the operating conditions of the R,B,G exposure light sources to accommodate for system drift and differing density characteristics among different film strips.

In the above cross-referenced copending U.S. application Ser. No. (Dkt 77989), a photographic film scanner is described that employs a programmed controller which operates in a manner to address the concerns just described. The controller is provided with a common timer and is programmed with a plurality of lookup tables (LUT), each LUT being populated with a sequence of elements defining timing of an operating activity of a respective one of the illuminant head light sources, the stepper motor and the light sensor data transfer circuits. The program operates to use the common timer to step synchronously through the elements of the LUT's to output value states from the elements of each of the LUT's; so as to suitably control the actuation timing of the respective light sources, stepper motor and data collection and transfer circuits. The arrangement described is a simple and convenient method and apparatus for control timing of critical operating functions in an image scanner.

The use of a plurality of lookup tables provides flexible, independent control of the integration periods of the three different color planes.

The host computer operates in an asynchronous manner relative to the timing operation of the film scanner. The host computer can have other tasks to perform that need to be completed before it can accept data from the scanner. In the scanner operation described above, however, the scanner is integrating light from the LEDs and if the host is late in accepting data from the scanner, and incorrect amount of light will have been collected and a bright line will ultimately appear in the reproduced image. There is therefore a need in the scanner of the type described to accommodate asynchronous operation of the host computer so that delays in accepting data from the scanner do not adversely affect the image data being transferred and thus do not create artifacts in the image reproduced from the transferred data.

SUMMARY OF THE INVENTION

In accordance with one aspect of the invention, therefore, there is provided a method of controlling image data collection and image data transfer from a photographic film scanner to a host computer, the film scanner having a line integrating image sensor and operating under the control of a microprocessor controller, wherein the method comprises providing a plurality of lookup tables (LUT) in the controller, each LUT populated with a sequence of elements defining timing of an operating activity in a respective one of (a) transfer out from the scanner of a line of collected image data, (b) on/off operation of one or more scanning exposure light sources and (c) step operation of a film transport drive stepper motor; using a common timer to step synchronously through the elements of the LUT's to output value states from the elements of each of the LUT's; and responding to the synchronously outputted value states from the LUT's to effect timing of actuation of the data transfer, LED and film transport drive stepper motor operations in accordance with the value states of the LUT elements. The invention includes determining if transfer of data to the host computer is delayed for a time in excess of a line integration period of the image sensor; and responding to the determination of the excess data transfer time to disable the LEDs until such time as the transfer of data to the host is complete.

In another aspect of the invention, there is provided apparatus for controlling image data collection and image data transfer from a photographic film scanner to a host computer, wherein the apparatus comprises a film scan gate; a film transport drive stepper motor for advancing film through the scan gate during an image frame scan operation; an illuminant head having an array of spectrally separated light sources; a line integrating image light sensor; and light sensor data transfer circuits for collecting and transferring light sensor data to a host computer. The apparatus also includes a controller having a common timer and programmed with a plurality of lookup tables (LUT), each LUT populated with a sequence of elements defining timing of an operating activity in a respective one of the illuminant head light sources, the stepper motor and the light sensor data transfer circuits, the program operating to use the common timer to step synchronously through the elements of the LUT's to output value states from the elements of each of the LUT's, which value states effect timing of actuation of the data transfer, light sources and stepper motor operations; and wherein the program is further operative to determine if transfer of data to the host computer is delayed for a time in excess of a line integration period of the image light sensor; and responding to the determination of the excess data transfer time to disable the LEDs until such time as the transfer of data to the host is complete.

In a further aspect of the invention, an improvement in the method and apparatus as just described is provided in which a long delay time limit is established that corresponds to a time in which stored image information in said image sensor becomes unrepresentative of pixel values in a scanned image line even though the LED lights have been disabled to suspend image light integration in the image sensor. The controller then determines if the excess data transfer time exceeds the long delay time limit; and responds to the determination of exceeding the long delay time limit to flush the unrepresentative stored image information from the image sensor before recommencing data collection and data transfer after the completion of transfer of the prior line of collected data.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

In the drawings:

FIG. 4 is a functional block diagram illustrating the hardware and software operating features of the scanner of FIG. 1;

FIGS. 5(a)–5(e) are lookup table (LUT) charts used for control of data collection and transfer, LED ON control and control of stepper motor operation in the scanner of FIG. 1;

FIG. 5(f) shows the common timer counter pulses used to step through the LUTs of FIGS. 5(a)–5(e);

FIG. 7 is a table showing the relationship between stepper motor pulses and image frame scan line resolution;

FIGS. 8(a)–8(c) are LUT charts for controlling the stepper motor to achieve the frame scan resolutions of FIG. 7;

DETAILED DESCRIPTION

Figure 1:
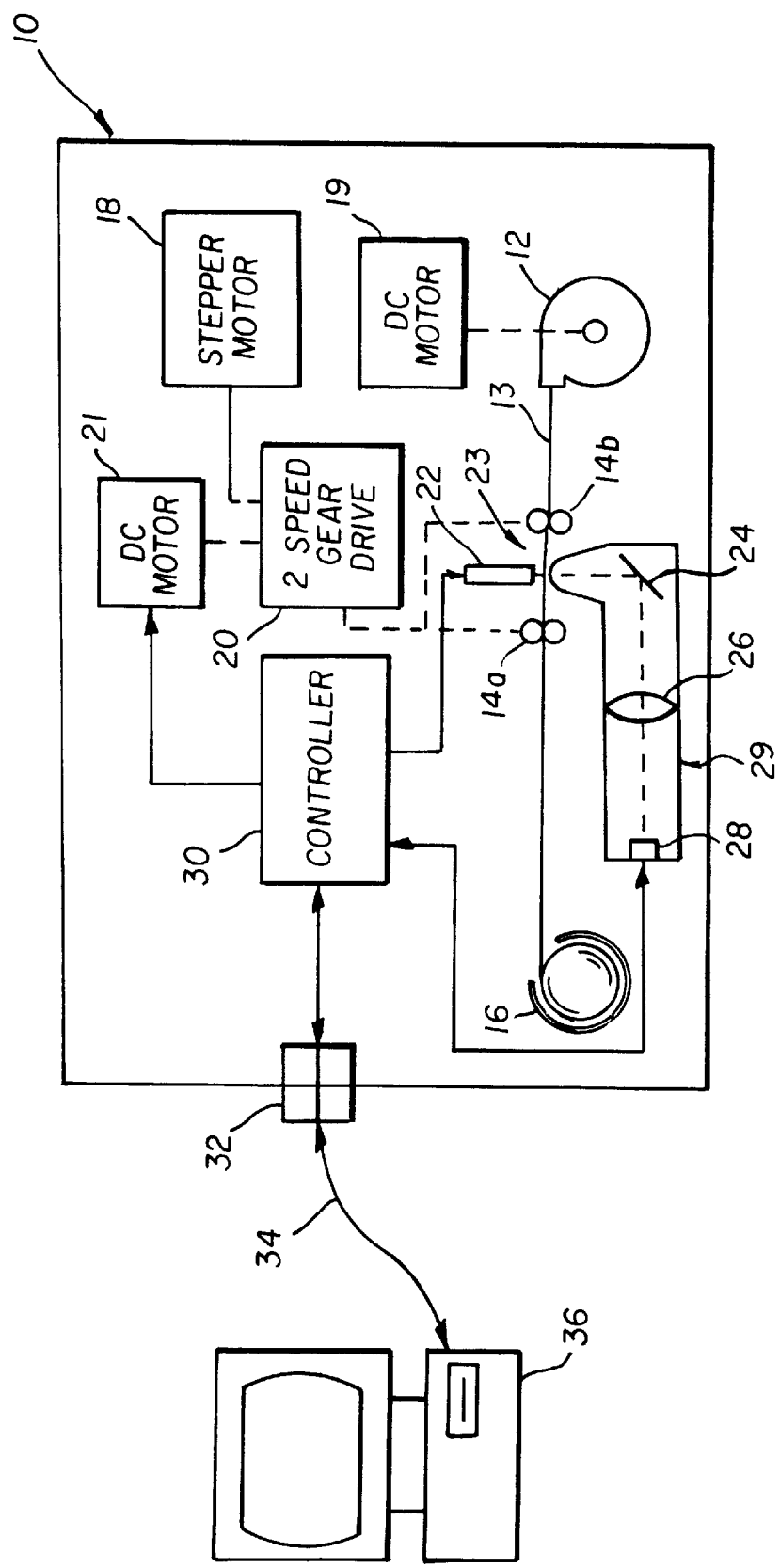
FIG. 1 is a functional block diagram of relevant hardware features of a photographic film scanner embodying the present invention.

For best understanding and appreciation of the present invention, it will be helpful to first describe the basic operational control of a photographic scanner which is the subject of the above disclosed in the above cross-referenced copending application. In FIG. 1, a film scanner 10 is shown schematically. A film supply cartridge 12 from which a processed film strip 13 extends through a film transport mechanism, comprising a pair of nip rollers 14a, 14b driven by a stepper motor 18, to a film takeup chamber 16. A dc motor 19 couples with the spool of the film supply cartridge to initially thrust the film strip from the cartridge to the nip rollers and later to drive the cartridge spool in the reverse direction in the course of rewinding the film back into the cartridge. The stepper motor 18 is coupled to the nip rollers by way of a two-speed gear drive mechanism 20. A dc motor 21 is connected to the gear drive mechanism to perform shifting between a high and low speed operations. The high speed operation is used for advancing the film in a forward direction between image frames and in the reverse direction during film rewind. The low speed operation is used in the forward direction during scanning of an image frame on the film. The scan line resolution for a particular image scan operation is selected by controlling the step rate of the stepper motor 18.

The space between the nip rollers 14a, 14b comprises a film scan imaging gate 23. This scan gate accommodates an imaging channel which includes an illuminant head 22 and an imaging assembly 29. In a preferred embodiment of the invention, the illuminant head 22 comprises a linear array of interleaved, spectrally separated LED light sources emitting light respectively in the red, blue and green spectra for transmission through the film image frame in the scan gate. By separately controlling the ON times of the red, blue and green LEDs the proper amount of light for each color is sent through the film to achieve a balanced color image from the film. The imaging assembly 29 comprises a mirror 24, a focussing lens 26 and a linear light sensor 28 for imaging the light transmitted through the film onto the linear light sensor. In the preferred embodiment being described herein, the light sensor 28 is preferably a trilinear CCD sensor of known construction having suitable red, blue and green filters to render the individual linear sensors separately responsive to the red, blue and green LED illuminants from the illuminant assembly.

A programmed controller 30 is provided to control the overall operation of the scanner. This includes connections to each of the motors to control the motor functions described above. In addition, the controller 30 is coupled to illuminant head 22, CCD sensor 28 and, via host interface 32 and cable 34, to a host computer 36 and operates to control the timing and processing of data output from the CCD sensor 28, the timing of data transfer to the host computer and the ON/OFF timing of the LED light sources in illuminant head 22. In accordance with the invention, a novel scanning algorithm is employed to collect the image data from the film by controlling CCD timing, to set the LED ON/OFF timing, the stepper motor timing and the timing of data transfer to the host interface, all through the medium of multiple software lookup tables (LUTs) operating from a common timing counter arrangement. Additionally, multiple LUTs can be used on a selective basis by the controller, again using the common timer, to set the step rate of the stepper motor 18 for any given image scan to thereby set the scan line resolution of image data for the film image frame being scanned.

Figure 2:
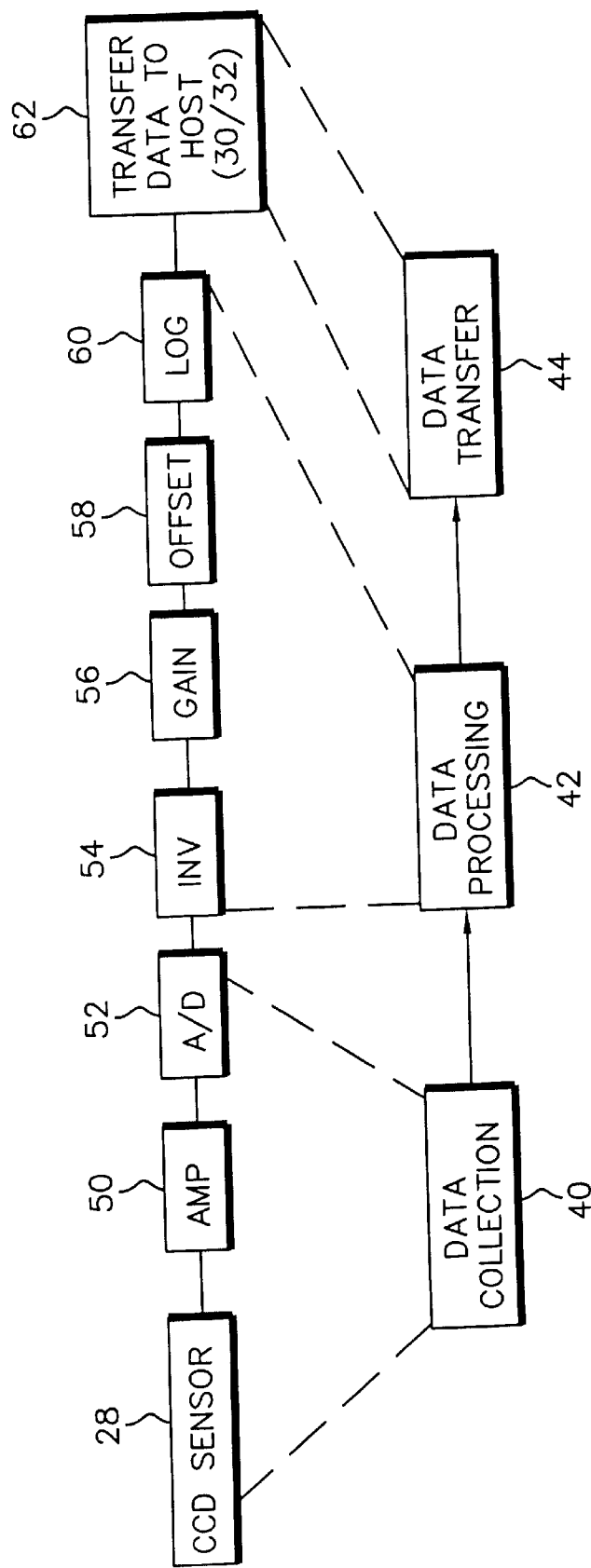
FIG. 2 is a functional block diagram of the image data collection, processing and transfer channel of the film scanner controller.

FIG. 2 shows, in functional block diagram form, a conventional signal channel employed in the scanner of FIG. 1 to perform the primary functions of image data collection 40, data processing 42 and data transfer 44 to a host computer 36, all under the control of the controller 30. As shown in the drawing, the data collection function 40 involves the CCD sensor 28, an analog signal amplifier 50 and an A/D converter 52 to convert the analog signal from the CCD sensor into digital data values. The data processing function 42 involves processing of the digital data from the A/D an inverter 54, gain and offset correction by units 56 and 58 and a linear to log conversion by unit 60. The data transfer function 44 is represented by unit 62 and involves transferring the collected data via the interface unit 32 at an appropriate time when the host computer is prepared to receive the data. The appropriate time is determined by what is known in the art as establishing a "handshake" between the computer 36 and the controller 30 via interface 32.

Figure 3:
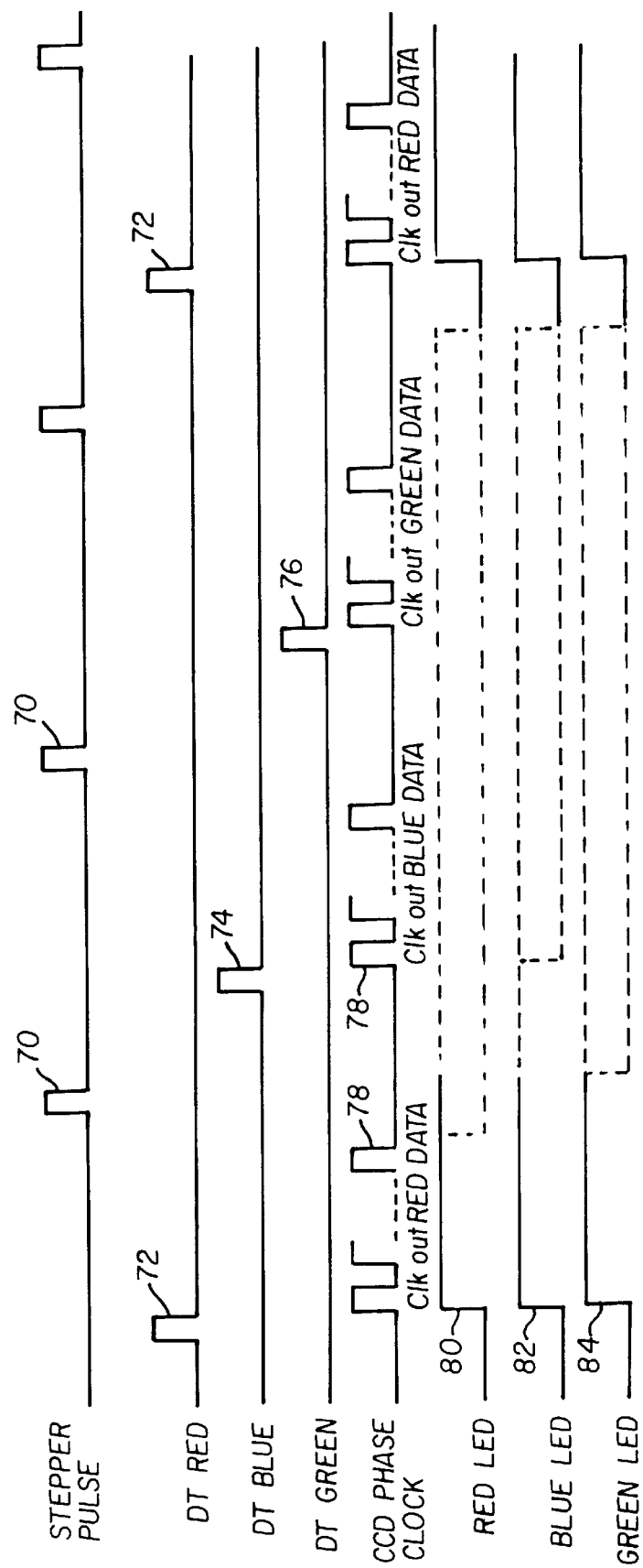
FIG. 3 is a timing diagram used in explaining the operation of the scanner of FIG. 1.

The timing diagram of FIG. 3 illustrates the timing relationships of the various functions described above. Pulses 70 represent the stepper motor timing pulses that determine the scan line resolution in the frame scan direction, that is, in the direction in which the film is transported through the frame scan gate. As will be seen, the illustrated pulses are for a high resolution scan (1500 pixels by 2625 scan lines). A lower scan line resolution would involve additional stepper motor timing pulses. Pulses 72, 74, 76 represent timing pulses which initiate data transfer from the scanner to the host computer of each of the red, blue and green color lines of data, respectively, clocked out from the CCD sensor 28 ("data collection", "data processing"). Three color lines of pixel data in the cross scan direction correspond to a single scan line in the frame scan direction. The CCD phase clock waveform show the timing pulses 78 sent to the CCD to clock out the red, blue and green linear sensors ("data collection"). The high states of the red LED, blue LED and green LED waveforms 80, 82, 84 represent the selectively variable ON times of the red, blue and green LED's, respectively, in the illuminant head 22.

FIGS. 4 shows, in block diagram form, the functional operations performed in accordance with the invention using a common timer 90 to step through the data arrays of each of a plurality of LUTs, data transfer LUT 92 and LED LUTs 93–95, as well as one of the stepper motor LUTs 96–98, with each LUT operationally controlling the timing its respective operating function. Data transfer LUT 92 outputs the timing pulses which initiate the data collection, processing and transfer functions of block 100. These functions of block 100 correspond to the Scan Foreground Process 120 in the controller 30 operating program to be described subsequently in reference to FIG. 6. Red, blue and green ON/OFF LUTs 93–95 output timing pulses that set the ON/OFF states of the red, blue and green LED light elements 102, 104, 106 located in the illuminant head 22. A plurality of stepper motor LUTs 96, 97 and 98 provided, one of which is selected by the operating program, as represented graphically by switches 108a, 108b, to output timing pulses that control stepper motor drive 107 to control the advance of the film through the scan gate during the frame scanning operation and thereby control the scan line resolution of the frame scan. The functions of blocks 102, 104, 106 and 107 make up the Scan Interrupt Process 140 of the controller operating program as shown in FIG. 6.

Referring now to FIGS. 5(a)–5(e), there are shown the data array contents of each of the LUTs 92–95 and the High Res. stepper motor LUT 96 of FIG. 4. Each array is 180 elements long comprised of two repeating sets of three color lines (red, blue and green) of 30 elements each. The first element of each array is represented in the upper left corner and the last element (no. 180) is represented in the lower right corner. Three color lines make up one frame scan line and thus each LUT array is two scan lines long. While the invention may be practiced with LUTs that are only a single scan line long, a LUT of two scan lines in length is used in the illustrated embodiment for reasons which will be explained in more detail later. The timer 90 (FIG. 4) generates timing counter pulses, shown in FIG. 5(f), that step through all the array elements of the data timing, LED and stepper motor LUTS in synchronism to output function controls dependent on the binary values of the array at each element position.

The data control LUT array of FIG. 5(a) contains a binary "1" value at the beginning of each color line to initiate the collection, processing and transfer to the host computer of a line of color data accumulated in the CCD during a previous CCD integration time period. The LED LUTs in FIGS. 5(b)–5(d) each contain binary values that determine the ON and OFF times of the LED light sources in illuminant head 22. The convention for the binary values in these LUTs is that a "0" value corresponds to an ON condition of the LEDs and a "1" value corresponds to an LED OFF condition. It may be noted from the LED LUT arrays that they all turn on their respective LEDs at the first element position and at some point within the first 90 elements they turn off their respective LED light. The starting time of the integration periods for the blue and green LUTs do not line up with the first element of the respective LED LUT array. Total integration time for a particular color is the time period between data transfer pulses (DT Red 72, DT Blue 74 and DT Green 76, respectively). Only for the red channel does the turning on of the LED's align with the transfer of the red information to the host computer. For the blue and green channels there is a ⅓ and ⅔ phase shift from when the lights are turned on to when the data is transferred. This is acceptable, however, since the modulus nature of the lookup tables ensures that the total ON time needed for a particular color is always maintained as specified in the appropriate LED LUT array. The stepper motor LUT of FIG. 5(e) issues a step command, indicated by a binary "1" value during the course of each line of color integration in the CCD thereby setting the image frame's scan line resolution in the frame scan direction. The resolution represented by the six "1" elements in the LUT 96 of FIG. 5(e) corresponds to high resolution frame scan.

Figure 6A:
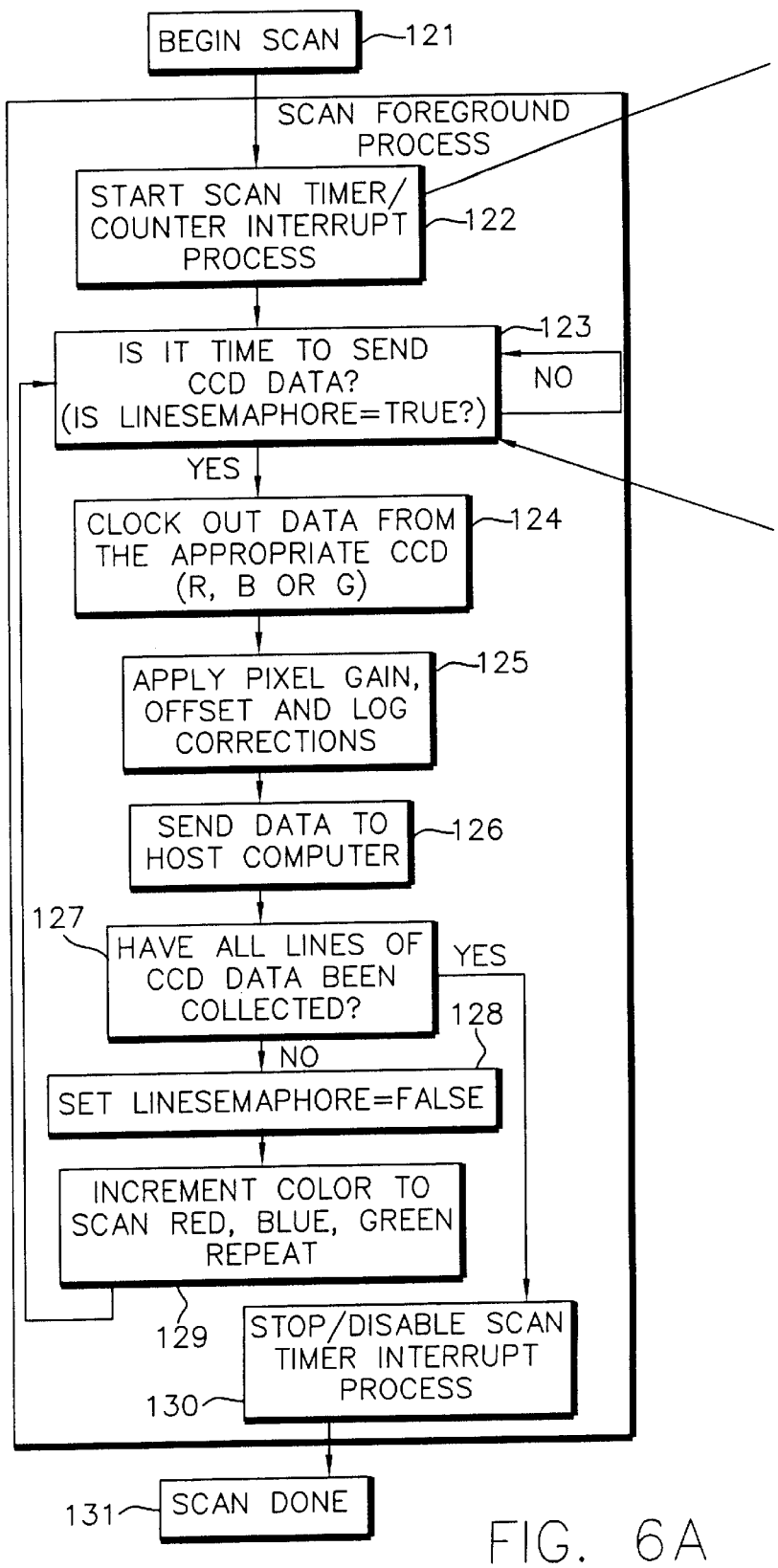
FIG. 6 is a flow chart for the program employed in the scanner controller of FIG. 1.
Figure 6B:
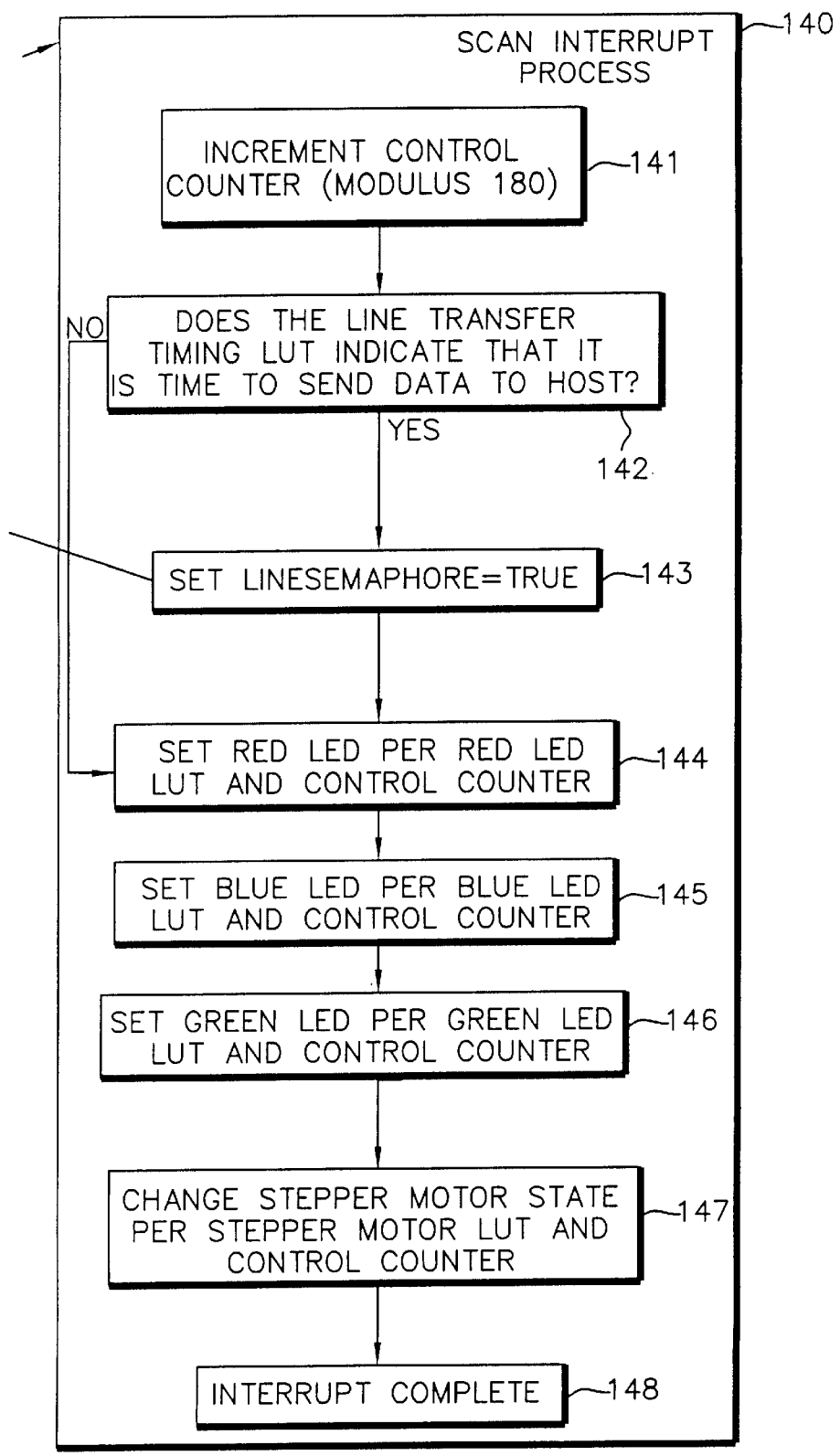

Turning now to the program flow chart of FIG. 6, step 121 begins a scan process in response to each occurrence of a timer pulse 115 (FIG. 5(f)). The scan process comprises a Scan Foreground Process 120 and Scan Interrupt Process 140 which operate independently. When the scan foreground process begins, step 122 starts the timer that, at the conclusion, of each timing period runs the interrupt process for one complete cycle. After initiating the timer, the scan foreground process moves to step 123 where it remains until a "LineSemaphore=True" flag is set by the interrupt process. This flag indicates that it is time to collect and transfer a line of color data from the CCD to the host computer. When step 123 detects this flag, the foreground process moves to step 124 to clock a line of color data (red, blue or green) out of the appropriate CCD sensor, then to step 125 in which the data is processed (pixel gain, offset and log correction) and then to 126 which effects transfer of the data to the host computer. Step 127 determines if the frame scan has been completed and, if not, the process moves to step 128, which sets the Line Semaphore flag to "false", and then to step 129, which increments a color scan counter to the next color to be scanned during the next iteration through the foreground process. After this, the process returns to step 123 to await the next "LineSemaphore=True"flag. If step 127 determines that the image frame scan is complete, the process branches to steps 130 and 131 which stop the scan processes until a new image frame scan command is received from the host computer.

Considering now the scan interrupt process 140, each time the process is initiated in response to an occurrence of the timer pulse 115, step 141 increments a control counter (modulus 180) to keep track of the element position within the LUT arrays. Step 142 then checks the element value in the Data Transfer LUT 110 and, if it is a "1", step 143 sets the "LineSemaphore=True" flag to enable the foreground process to start the data collection and transfer operation described above. If LUT 110 returns a "0" value, the flag setting step is bypassed. The interrupt process then moves through each of steps 144–146 to set the LED ON/OFF conditions in accordance with the element values returned from LED LUTs 111–113, respectively. After this, the process moves to step 147 which checks stepper motor LUT 114, assuming the scanner is set to high resolution scan, to advance the film one step each time an element value "1" is returned from the LUT. Following this, the process moves to step 148 which stops the interrupt process pending receipt of another start command in response to the next timer pulse 115.

Referring now to FIGS. 7 and 8(a)–8(c), it will be recalled from the discussion of FIG. 4 that the scan line resolution for an image frame scan can be selected by merely choosing from a plurality of available stepper motor LUT arrays 96–98. FIG. 7 shows a chart correlating the number of stepper motor pulses per scan line to the corresponding image frame scan line resolution for an actual embodiment of the invention. FIGS. 8(a)–8(c) show the array contents for each of the LUTs 96–98 correponding to the high, medium and low frame scan line resolutions, respectively. For the particular embodiment disclosed herein, frame scan line resolutions of 2625 lines (high res.), 1750 (med. res.) and 875 (low res.) are available. These resolutions translate to 3, 4.5 and 9 motor steps per scan line, respectively. Since it is not possible to have a one-half motor step pulse, the LUT arrays are all arranged to be two scan lines in length (180 array elements). In this way, as seen in LUT array 97, the odd step pulse requirement is readily accommodated by the use of nine "1" elements spaced within the two scan line array of the stepper motor medium resolution LUT 97. LUT arrays 96 and 98 simply repeat the same "1" pattern in both scan line segments. The pixel line scan direction is set to interpolate the pixels in each scan line to achieve a constant 1.75 image aspect ratio in the data for any scan resolution. For high resolution, there is no pixel interpolation since in the pixel line scan direction there are 1500 pixels of CCD data across the image and the ratio of 2625 to 1500 is 1.75. For medium resolution, the 1500 pixels is interpolated in known manner down to 1000 pixels and, for low resolution, the pixel data is interpolated down to 500 pixels.

Figure 9:
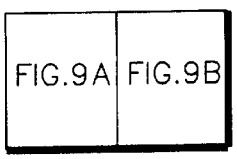
FIG. 9 is a program flow chart illustrating an improvement in the operation of the controller in accordance with one aspect of the present invention directed at accommodating delays in acceptance of data by the host computer.
Figure 9A:
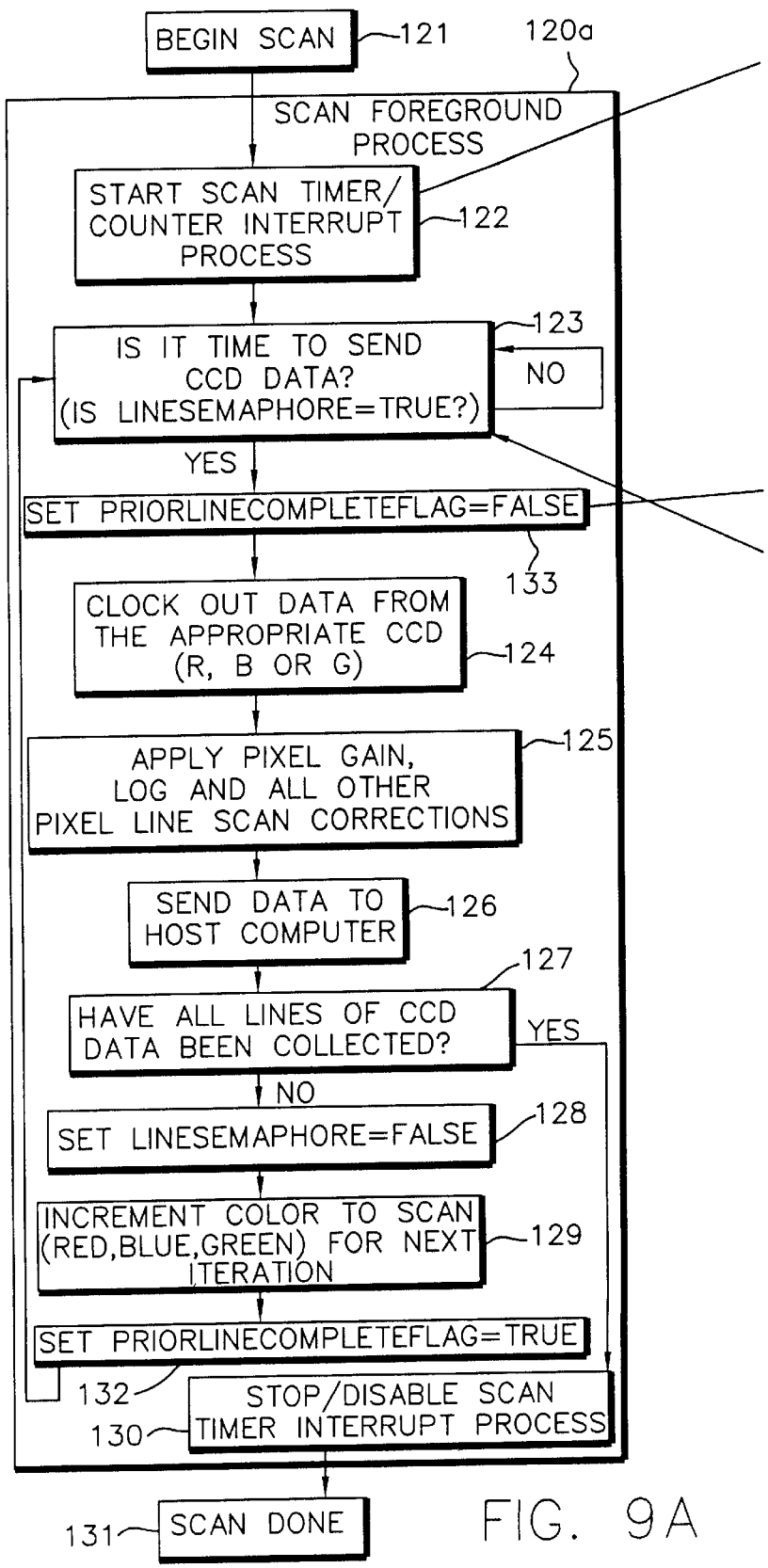
Figure 9B:
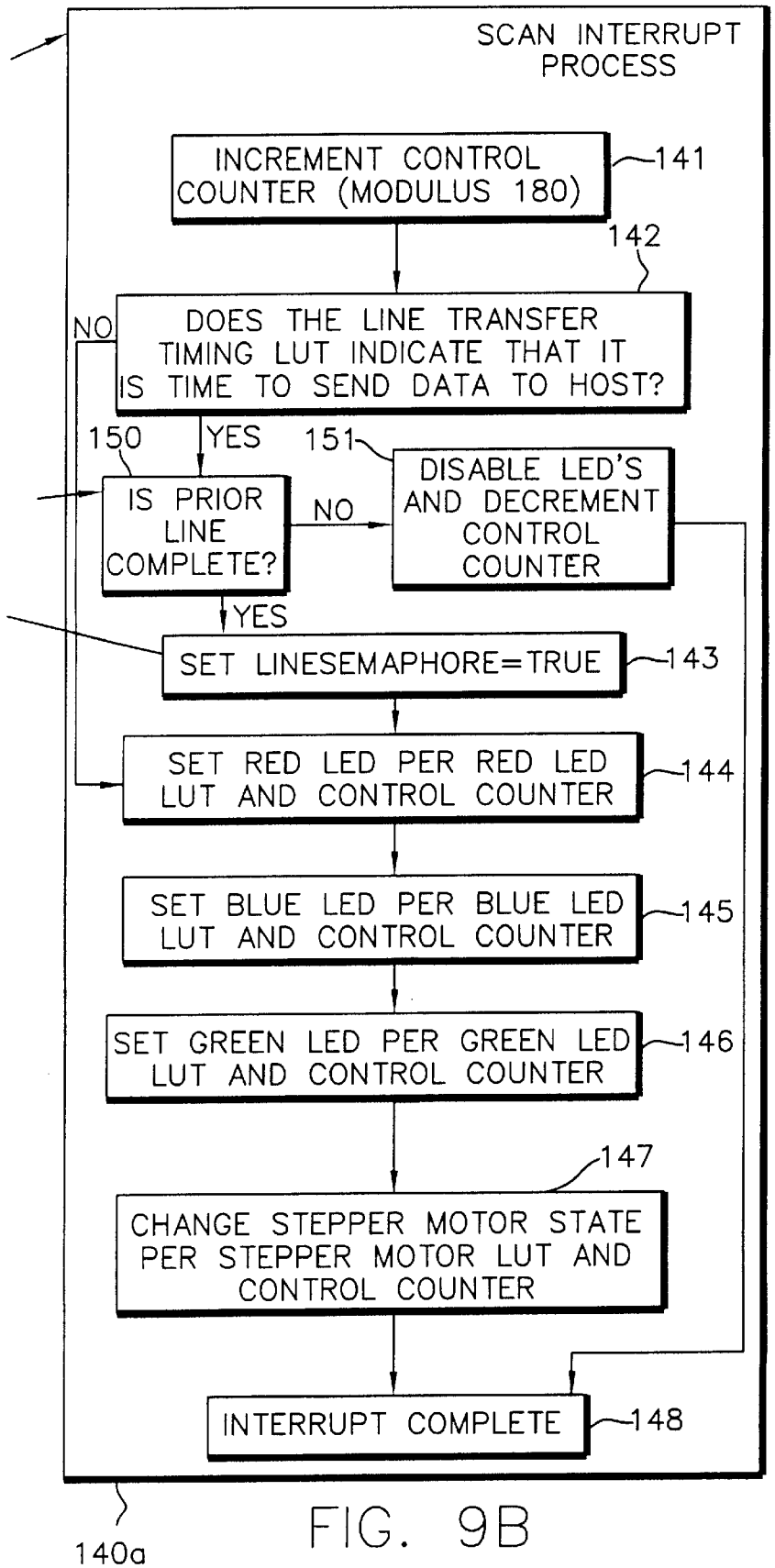

What has been described up to this point is the basic operational control of a film scanner which is the subject of the above cross-referenced copending application. Turning now to FIG. 9. there is shown a program flow chart for the controller 30 which, in accordance with the present invention, solves the problem of transferring data from the film scanner 10 to the host computer 36 when, due to the asynchronous operation of the host computer, the host is unable to accept the data from the film scanner at the time dictated by the data transfer timing pulse in data transfer LUT 92. The scanner is continuously integrating the light from the LEDs as dictated by the ON/OFF timing pulses in LUTs 93–95. If the host is late and is unable to accept a new line of data when dictated by the timing pulse in LUT 92, an incorrect amount of light will have been collected when the host later accepts the data and, in the positive image reproduced from such data, a dark line will appear in the image.

To prevent this from happening, the controller program is modified as shown in FIG. 9. In all respects, the flow chart of FIG. 9 is the same as that of FIG. 6, except for the modifications now described. In the scan foreground process 120a, a "PriorLineCompleteFlag=True" step 132 is inserted following existing step 129 at the conclusion of the transfer of a line of data to the host computer to indicate that a line of color data has been successfully transferred to the host. Similarly, a new step 133 to set the "PriorLineCompleteFlag=False" is inserted following existing step 123 to indicate that the data transfer is in process and is not yet complete. In the scan interrupt process 140a, a query step 150 is included following the affirmative output of query step 142. Query step 150 responds to the flag setting condition at step 133 in the scan foreground process to indicate whether the transfer of the prior line of data has been completed. If so, the interrupt process proceeds with the normal LED ON/OFF and stepper motor advance operations to the completion of the interrupt cycle. If not, step 150 branches to step 151 to disable the LEDs and decrement the modulus 180 control counter after which the process moves to the interrupt cycle complete step 148.

The operation of the program with these modifications is as follows. It will be assumed that data transfer has been initiated and the foreground process has proceeded to step 126, as described above in respect to the program flow chart of FIG. 6. Conventional data transfer procedure within step 126 involves establishing a "handshake" between the film scanner and the host computer for each word of data being transferred. This assures that the asynchronously operating host computer (relative to the scanner) will accept the data word. If delays are incurred, the process will remain in the step 126 stage until all data has been transferred. During this delay time, the "PriorLineCompleteFlag=False" remains set in foreground step 133. This being the situation, when the interrupt process determines from LUT 92 that it is time to begin transfer of the next line of data to the host, the process moves to step 150. Under normal conditions, the flag setting from step 132 would be true and the interrupt process would move from step 150 to step 143 setting the LineSemaphore to true thereby allowing the foreground process to begin the data transfer process. However, in this case, step 150 determines that the prior line data transfer has not been completed and branches to step 151 which turns off the LEDs and decrements the control counter so as to hold the counter at its prior count value (element position in the LUT arrays). The decrementing of the control counter in step 151, in effect, puts the entire scan process, both foreground and interrupt, on hold, despite the repeating occurrence of the timing pulses (FIG. 5(f)), until such time as the line of data transfer is completed and the "PriorLineCompleteFlag= True" is set in step 132. At this time, the next line of data is transferred to the host computer, the control counter resumes incrementing the position counts in the LUT arrays and the LEDs resume their ON or OFF condition in accordance with the timing control of the LED LUTs 93–95 and the stepper motor is stepped by the appropriate one of LUTs 96–98.

In the operation just described, in which the LEDs are turned OFF to suspend light integration in the CCD and the stepper motor is inactivated for the duration of the delay in data transfer to the host, the delays are usually sufficiently short in duration that the accumulated charge values in the CCD light sensors are not noticeably affected by the delay period and the resultant data generated when the line is ultimately clocked out is an accurate representation of the pixel values in that line of the scanned image. With the LEDs in the OFF condition, the charge integration in the CCD sensors from the image light is stopped and the CCD charge values can be clocked out and used to generate the digital image data for the suspended image scan line. However, there is always some minute amount of continued charge integration that results from the known phenomenon of CCD operation referred to as dark current build-up. For short delays, the effect of dark current build-up on charge value is negligible. However, there may be occasions when the data transfer delays are long enough in duration that the charge values in the CCD sensors become adversely affected by excessive dark current build-up. Thus, when the long delayed data is finally completely transferred to the host computer, the next line of data to be collected from the CCD and transferred to the host will be bad by virtue of the build up of dark current in the CCD sensors. To guard against this possibility, another embodiment of the invention is employed, as shown in the program flow chart of FIG. 10, that operates to recognize the occurrence of the excessive delay, to rid the CCD/data channel of bad data and to recreate the line with valid data that can then be transferred to the host.

Figure 10B:
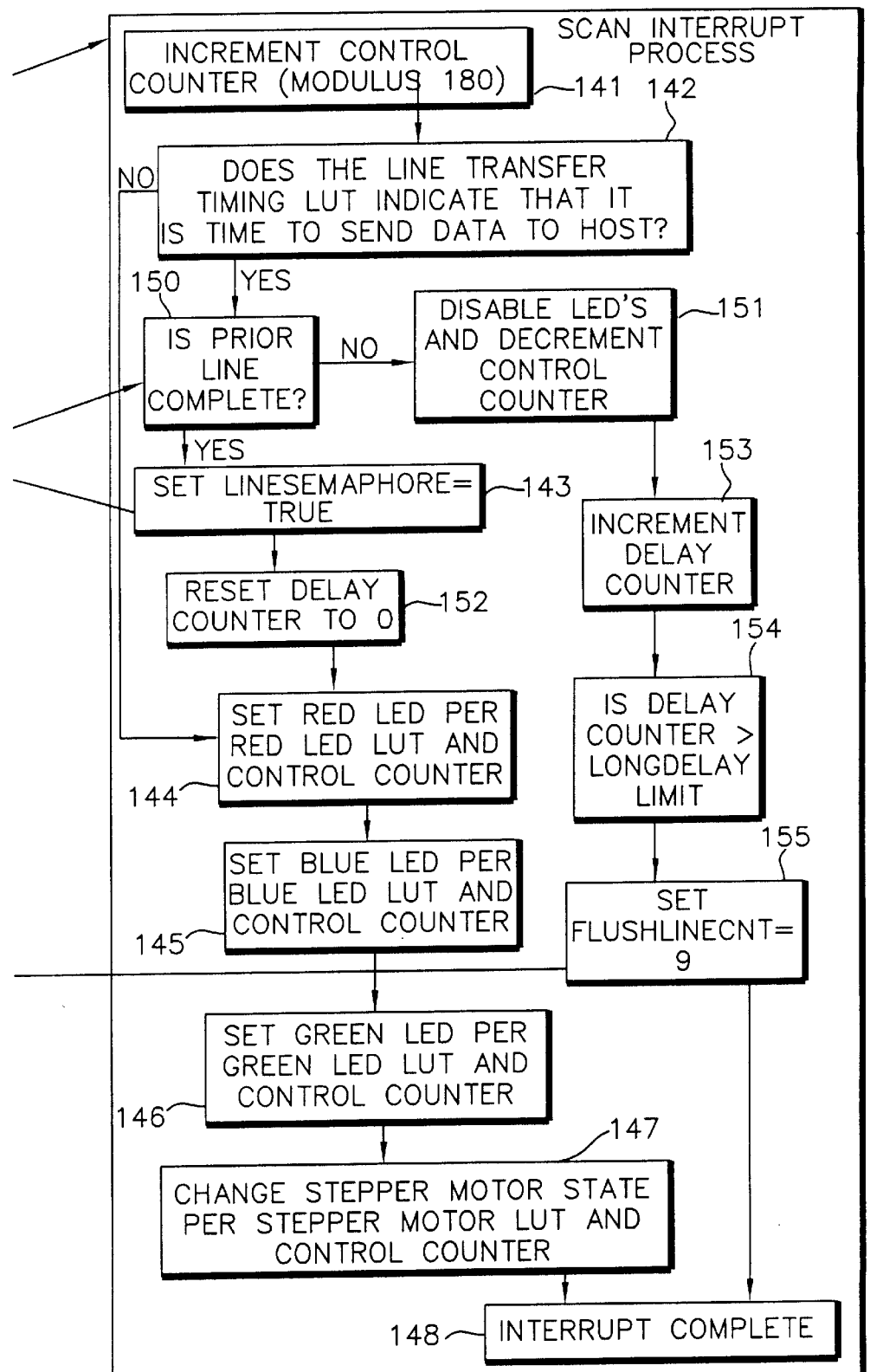
FIG. 10 is a program flow chart illustrating a further improvement in the controller operation to accommodate excessively long delays by the host computer in accepting data transfer from the film scanner.

The program flow chart of FIG. 10 is largely the same as that of FIG. 9 with the exception of the modifications now described. For the modified program, a delay time limit is established which is empirically determined to correspond to a time in which stored image information in the image sensor becomes unrepresentative of pixel values in a scanned image line. With an excessively long delay in data transfer for past line scan, the sensor pixel values for the next line of data become unrepresentative of the image pixel values because of dark current build-up on the charge values in the CCD sensors. To implement this long delay tracking in the program, a delay counter is employed to track the number of counts in timer 90 occurring after determination that the transfer of data for the current line has been delayed (steps 142 and 150). This corresponds to the number of times of short delay cycles that the interrupt process has cycled through to cause step 151 to decrement the control counter pending notification at step 150 that transfer of the prior line of data has been completed. In an actual embodiment, a delay of twenty cycles through the interrupt process is set as the long delay limit.

In the interrupt process 140b, step 152 is inserted after step 143 "Set LineSemphore=True" to reset the delay counter to zero each time that step 150 determines that the prior line data transfer operation has been completed. This begins the excess delay count. Each time the interrupt process encounters a data transfer delay in step 126 that results in step 151 disabling the LEDs and decrementing the control counter in step 151, as previously described in regard to the short delay process of FIG. 9. The interrupt process now moves to step 153 which increments the long delay counter and then to query step 154 which determines if the delay counter exceeds the predetermined long delay limit described above. As long as the delay is shorter than the long delay limit, the interrupt cycle then terminates at step 148. If, however, query 154 determines that the LongDelay limit is exceeded, the process moves to step 155 which sets a "FlushLineCnt to a predetermined count which, in the case of the illustrated embodiment, is a count of 9. Since, by definition, a delay that exceeds the predetermined long delay limit will likely result in bad data due to the excess dark current charge build-up in the CCD sensors, it is necessary to flush the charges out of the three CCD lines and to return the CCD to the color line that was to be have been clocked out but for the bad data that would result. Thus at least three lines of charge must be flushed out of the CCD. To ensure that the CCD is fully restored to its normal state, it is preferable to cycle through several flush cycles of three lines each and, thus, nine lines (three full flush cycles) are employed in the preferred embodiment. It is apparent that the addition of steps 153–155 operate to set the flush line counter so as to establish the initiation of the CCD line flush process in the foreground data transfer process 120b.

In the foreground process 120b, a query step 134 is inserted to track the status of the FlushLineCnt. If it is greater than zero, indicating that data readout is in the flush line mode, the process branches to step 135 to decrement the FlushLineCnt value before proceeding directly to step 128 and the remainder of the foreground process. The effect of this is to bypass the data processing step 125 and data transfer to host step 126. In this way the CCD data is routinely clocked out from the CCD in normal manner during each cycle through the foreground process but the data is discarded without being transferred to the host computer. During the line flushing operation, foreground process step 132 sets the "PriorLineComplete Flag =True" each time through even though the data is ignored. This allows the interrupt process to move normally through the LED ON/OFF steps 144–146. However, a new step 156 is inserted after the LED steps to determine if the flush process is in progress by checking the status of the flush counter. Normally, the result would be negative and the stepper motor would be advanced, as determined by the appropriate stepper motor LUT. However, if the flush count is greater than "0", step 156 branches directly to the interrupt complete step 148. The effect of this is to ensure that the stepper motor does not advance the film during the CCD line flushing operation so that when collection of good data is eventually reinitiated, the image scan remains the same as the one for which the bad data was discarded. Once step 134 determines that the flush counter has decremented to zero indicating the end of the flush process, the overall scan process reverts to normal operation beginning with collection and transfer of data to the host at the same line for which the data had previously been corrupted due to the excessive dark current build-up.

It will be appreciated that what has been described is a simple and convenient method and apparatus for control timing of data transfer between a film scanner and a host computer operating asynchronously of the film scanner, such that the pixel image data being transferred is not adversely affected by data transfer delays caused by the asynchronous operation of the host computer.

The invention has been described in detail with particular reference to certain preferred embodiments thereof, but it will be understood that variations and modifications can be effected within the spirit and scope of the invention. For example, the LUT-based operating program is described as being resident in the film scanner internal controller. It will be appreciated that the program may equally well comprise an application program resident entirely on the host computer to which the scanner is connected or divided between the host computer and a controller internal to the film scanner and the term microprocessor controller used herein is intended to refer to either or both an internal scanner controller and a host computer.

| PARTS LIST | |
|---|---|
| 10 | film scanner |
| 12 | film cartridge |
| 13 | processed film strip |
| 14a,b | nip rollers |
| 16 | film takeup chamber |
| 18 | stepper motor |
| 19 | dc motor |
| 20 | two speed gear drive mechanism |
| 21 | dc motor |
| 22 | illuminant head |
| 23 | imaging gate |
| 24 | mirror |
| 26 | focussing lens |
| 28 | linear light sensor |
| 29 | imaging assembly |
| 30 | controller |
| 32 | host interface |
| 34 | cable |
| 36 | host computer |
| 50 | amplifier |
| 52 | A/D converter |
| 54 | inverter |
| 56 | gain corrector |
| 58 | offset corrector |
| 60 | linear to log converter |
| 90 | timer |
| 92 | data transfer LUT |
| 93–95 | LED LUTs |
| 96–98 | stepper motor LUTs |
| 100 | data transfer block |
| 102 | red LED driver |
| 104 | blue LED driver |
| 106 | green LED driver |
| 107 | stepper motor driver |
| 120, 120a, 120b | scan foreground processes |
| 140, 140a, 140b | scan interrupt processes |

What is claimed is:

1. A method of controlling image data collection and image data transfer from a photographic film scanner to a host computer, said film scanner having a line integrating image sensor and operating under the control of a digital controller, the method comprising:

providing a plurality of lookup tables (LUT) in the controller, each LUT populated with a sequence of elements defining timing of an operating activity in a respective one of (a) transfer out from the scanner of a line of collected image data, (b) on/off operation of one or more scanning exposure light sources and (c) step operation of a film transport drive stepper motor;

using a common timer to step synchronously through the elements of the LUT's to output value states from the elements of each of the LUT's;

responding to said synchronously outputted value states from said LUT's to effect timing of actuation of said data transfer, LED and film transport drive stepper motor operations in accordance with said value states of the LUT elements;

determining if transfer of data to said host computer is delayed for a time in excess of a line integration period of said image sensor; and responding to said determination of said excess data transfer time to disable said LEDs until such time as said transfer of data to said host is complete.

2. The method of claim 1 further comprising:

incrementing a control counter in synchronism with pulses from said timer to keep track of element positions in said LUTs; and in response to each determination of said excess data transfer time to decrement said control counter thereby holding a constant element position in said LUTs for the duration of said excess data transfer time ending with completion of transfer of a prior line of collected data.

3. The method of claim 2 further comprising:

establishing a long delay time limit corresponding to a time in which stored image information in said image sensor becomes unrepresentative of pixel values in a scanned image line;

determining if said excess data transfer time exceeds said long delay time limit; and responding to said determination of exceeding said long delay time limit to flush said unrepresentative stored image information from said image sensor before recommencing data collection and data transfer after said completion of transfer of said prior line of collected data.

4. The method of claim 3 further comprising:

responding to said determination of exceeding said long delay time limit to deactivate said stepper motor operation until said data collection and data transfer is recommenced.

5. Apparatus for controlling image data collection and image data transfer from a photographic film scanner to a host computer, the apparatus comprising:

a film scan gate;

a film transport drive stepper motor for advancing film through said scan gate during an image frame scan operation;

an illuminant head having an array of spectrally separated light sources;

a line integrating image light sensor;

light sensor data transfer circuits for collecting and transferring light sensor data to a host computer; and a controller having a common timer and programmed with a plurality of lookup tables (LUT), each LUT populated with a sequence of elements defining timing of an operating activity in a respective one of said illuminant head light sources, said stepper motor and said light sensor data transfer circuits, said program operating to use said common timer to step synchronously through the elements of the LUT's to output value states from the elements of each of the LUT's, which value states effect timing of actuation of said data transfer, light sources and stepper motor operations;

said program being further operative to determine if transfer of data to said host computer is delayed for a time in excess of a line integration period of said image light sensor; and responding to said determination of said excess data transfer time to disable said LEDs until such time as said transfer of data to said host is complete.

6. The apparatus of claim 5, said program is further operative to increment a control counter in synchronism with pulses from said timer to keep track of element positions in said LUTs; and in response to each determination of said excess data transfer time to decrement said control counter thereby holding a constant element position in said LUTs for the duration of said excess data transfer time ending with completion of transfer of a prior line of collected data.

7. The apparatus of claim 6 said program being further operative to establish a long delay time limit corresponding to a time in which stored image information in said image sensor becomes unrepresentative of pixel values in a scanned image line; to determine if said excess data transfer time exceeds said long delay time limit; and to respond to said determination of exceeding said long delay time limit to flush said unrepresentative stored image information from said image sensor before recommencing data collection and data transfer after said completion of transfer of said prior line of collected data.

8. The apparatus of claim 7 said program being further operative to respond to said determination of exceeding said long delay time limit to deactivate said stepper motor operation until said data collection and data transfer is recommenced.

* * * * *